April 18, 1961 W. H. ROYER 2,980,038
LEVEL LOADER AND UNLOADER FOR BAKING OVEN
Filed Dec. 27, 1957 5 Sheets-Sheet 1

INVENTOR.
Wayne H. Royer
BY
Otto Moeller
Attorney

INVENTOR.
Wayne H. Royer

April 18, 1961 W. H. ROYER 2,980,038
LEVEL LOADER AND UNLOADER FOR BAKING OVEN
Filed Dec. 27, 1957 5 Sheets-Sheet 3
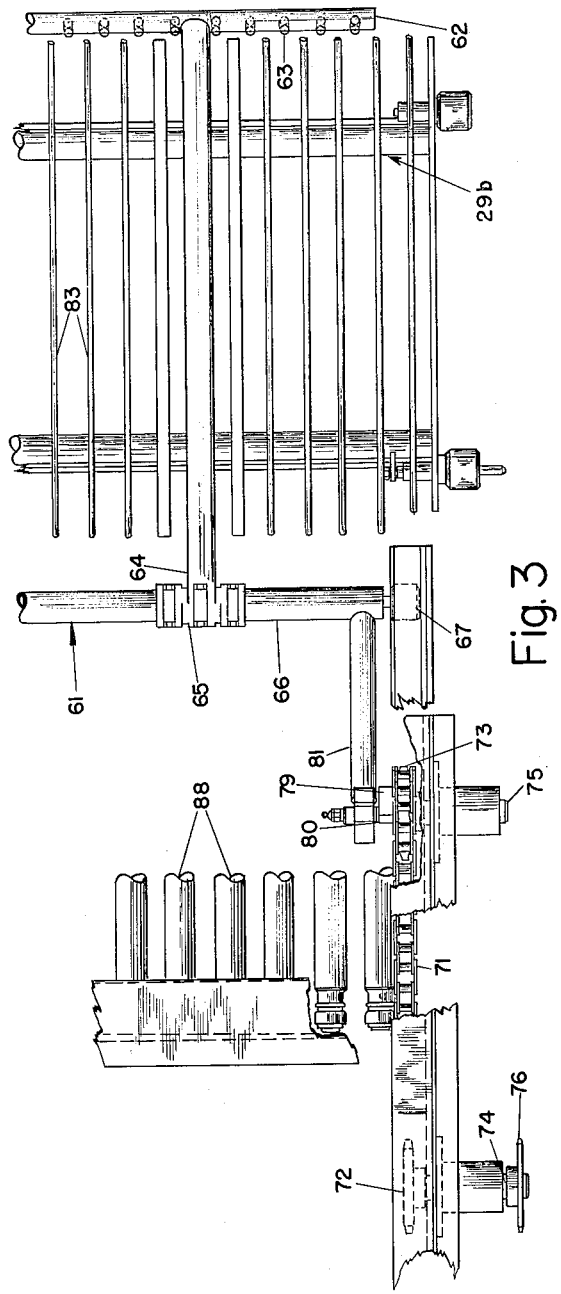
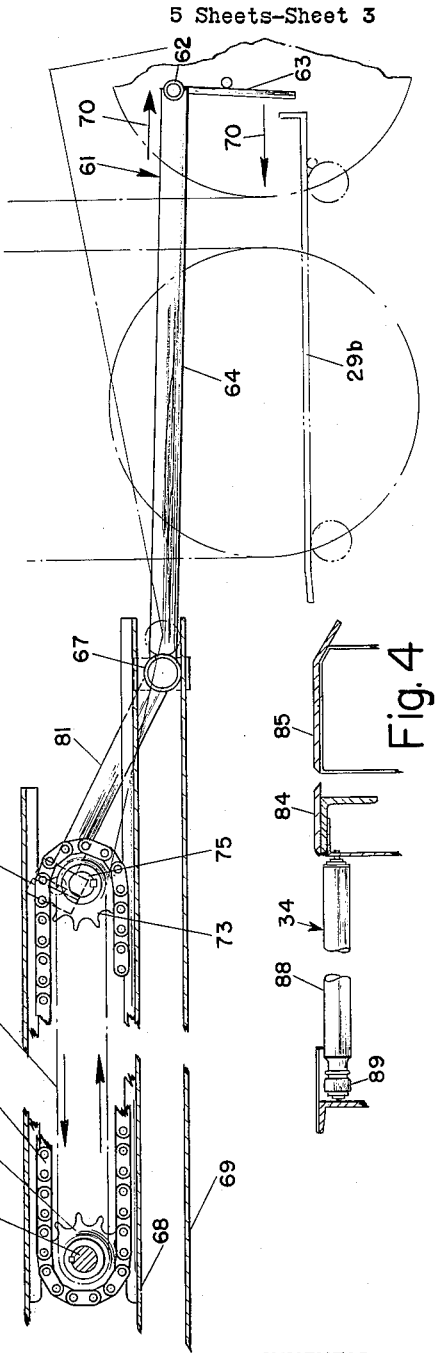
INVENTOR.
Wayne H. Royer
BY
Otto Moeller
Attorney

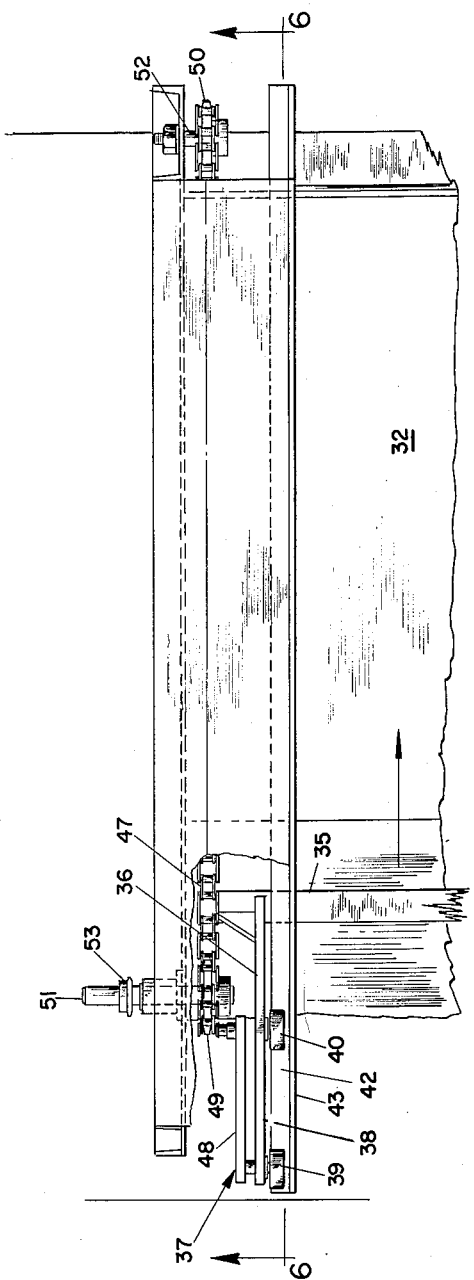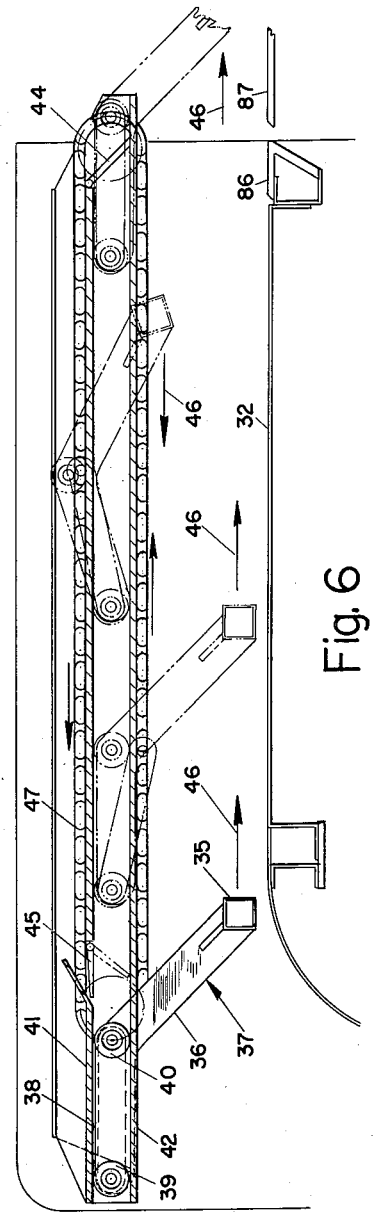

INVENTOR.
Wayne H. Royer
BY Otto Moeller
Attorney

2,980,038
Patented Apr. 18, 1961

United States Patent Office

2,980,038

LEVEL LOADER AND UNLOADER FOR BAKING OVEN

Wayne H. Royer, York, Pa., assignor to Capitol Products Corporation, Mechanicsburg, Pa., a corporation of Pennsylvania Filed Dec. 27, 1957, Ser. No. 705,666

6 Claims. (Cl. 107—57)

This invention relates to improved loading and unloading means for loading pans of dough to be baked onto and unloading pans of baked goods from the trays of a traveling tray type oven. The oven to which the present invention is particularly adapted comprises an endless conveyor traveling in a closed circuit in the baking chamber, the conveyor being provided with a series of equidistantly spaced trays which are brought during their travel in close proximity to a loading and unloading opening in the front wall of the oven.

A common arrangement for unloading pans of baked goods from the oven trays includes means for tilting the trays as they approach the front of the oven adjacent their arcuate path of travel from the lower to the upper run of the tray conveyor, thereby permitting the pans to slide by gravity from the trays onto a transversely extending take-away conveyor that transports the pans from the oven. Tilting of the trays to unload the pans of baked goods is objectionable, particularly in the case of pies or cakes having a soft filling, since the filling material has a tendency to flow, resulting in an imperfect final product. In addition, the shock incidental to the pans striking the takeaway conveyor as they slide from the tilted trays, has a tendency to impair the soft baked products. It is, therefore, an object of the present invention to provide novel and improved loading and unloading means that maintains the pans in level horizontal position at all times.

Another object is to provide novel loading and unloading means for delivering pans of products to be baked to and removing pans of baked products from the trays of an oven of the type described above, through a common opening in the oven front wall. A related object is to provide a novel level oven loader and unloader of the type described that is portable and movable as a unit into or out of operative association with the oven, whereby the various components are readily accessible.

A further object is to provide a novel oven loader and unloader of the type described, wherein the loader and unloader are adapted to operate simultaneously for loading pans of products to be baked onto one tray of the oven conveyor alined with the loader and at the same time unloading pans of baked products from another tray of the oven conveyor alined with the unloader.

The novel loader and unloader structure includes superimposed horizontal loading pan supports and unloading pan supports disposed outside the oven and extending into an opening in the oven front wall terminating adjacent the vertical run of the oven tray conveyor, the supports being spaced a vertical distance apart equal to the spacing between successive trays of the tray conveyor. It also includes a sweep member movable over the loading pan support for engaging and slidingly moving the pans over the loading pan support onto an alined tray of the tray conveyor, and a simultaneously operated rake member movable over another tray of the tray conveyor alined with the unloading pan support for engaging pans and slidingly moving them off the tray onto the unloading pan support. The rake is arranged to move to its extended position, or in other words, to a position where it is engageable with the pans for raking them off a tray, while the tray conveyor is in operation and as it approaches a position to bring a tray in alinement with the unloading pan support, the rake being arranged during such movement to travel in an elevated path above the level of a pan on a tray when in alinement with the unloading pan support. This is an important feature of the invention since it permits slower and therefore smoother operation of the rake without slowing down of the operation of the tray conveyor or stopping of the tray conveyor prior to its alinement with the unloading pan support to permit movement of the rake to its extended position without fouling thereof against the pans on a tray of the tray conveyor.

It is further contemplated that the portion of the unloading pan support outside the oven include a take-away conveyor onto which the rake moves the pans, whereby the pans are transported away from the loader and unloader structure. The invention includes means for operating the sweep member, rake member and take-away conveyor in timed relation with the tray conveyor of the oven, and control means for energizing and deenergizing these various elements in appropriate timed relation with respect to each other, to provide rapid, smooth and accurate loading, unloading and removal of pans.

These and other objects and advantages of the invention and the manner in which they are realized will become apparent from the following description which, considered in connection with the accompanying drawings, sets forth the preferred embodiment of the invention.

In the drawings:

Figure 3 is an enlarged, fragmentary plan view of the unloader, taken on line 3—3 of Figure 2, parts being broken away;

Figure 4 is an enlarged sectional view taken on line 4—4 of Figure 2, looking in the direction of the arrows;

Figure 5 is an enlarged, fragmentary plan view of the loader, taken on line 5—5 of Figure 2, parts being broken away;

Figure 6 is a sectional view taken on line 6—6 of Figure 5, looking in the direction of the arrow;

Figure 1:
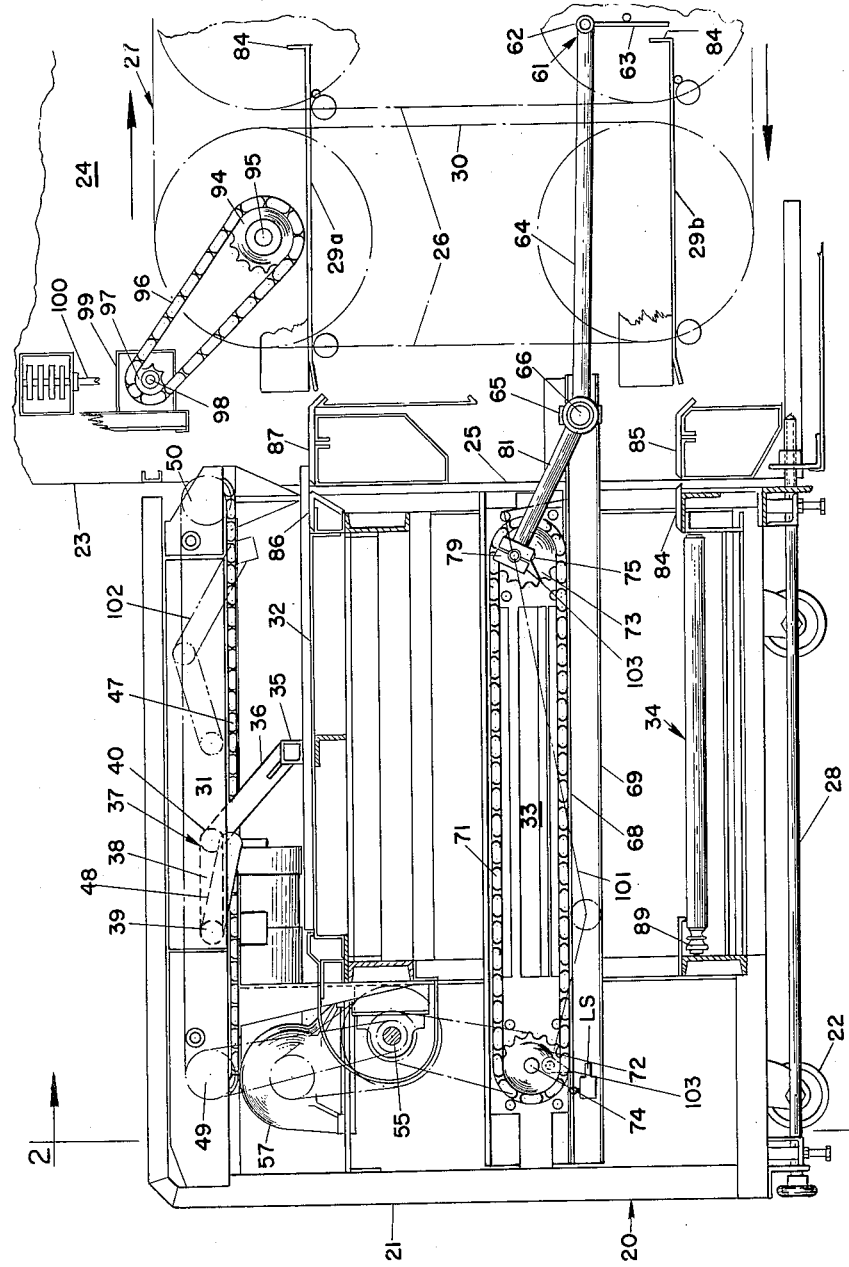
Figure 1 is a longitudinal vertical sectional view through the loader and unloader and the adjacent portion of the oven to which it is applied, some parts being shown in elevation and other parts being shown diagrammatically.

Referring to the drawings, and more particularly to Figure 1, the portable level oven loading and unloading device embodying our invention includes an upright, generally rectangular frame structure 20, made up of angle irons and other structural elements. The frame structure 20 is preferably partially enclosed by sheet metal panels 21, secured thereto in any suitable manner. For convenience, the frame structure 20 is mounted on casters 22 whereby the device may be readily moved toward or away from the oven front wall 23 into or out of operative relation with respect to the oven 24.

When in operative position, portions of the loading and unloading elements of the device project through an opening 25 in the oven front wall 23 to cooperate with the vertical run 26 of the oven tray conveyor 27 to load pans of products to be baked onto and unload pans of baked products from successive trays carried by the tray conveyor 27. Suitable means, such as latch rods 28 carried by the frame structure 20, are provided for securing the device to the oven 24.

The tray conveyor 27 includes a plurality of equidistantly spaced trays, two of which are shown at 29a and 29b, arranged to be moved through the oven in an endless path, in the direction of the arrows, by endless chains at opposite sides of the oven. The tray conveyor includes an endless chain 30 for stabilizing or maintaining the trays in horizontal position as shown and described in more detail in my Patent No. 2,931,322, granted April 5, 1960. The specific tray conveying and stabilizing means does not constitute a part of the present invention, and is therefore not described in detail.

Mounted on the frame structure 20 in vertical spaced relation are, from top to bottom, a loader 31 for moving successive transverse rows of pans of dough onto successive trays of the tray conveyor 27; a pan supporting or loading shelf 32; an unloader 33 for removing successive transverse rows of pans of baked products from successive trays of the tray conveyor 27; and a take-away conveyor 34 for conveying from the oven successive rows of pans of baked products delivered thereto by the unloader 33.

The loader 31 is of the sweep means type and, referring particularly to Figures 1, 2, 5 and 6, includes a transversely extending sweep bar 35 which is carried adjacent its ends by the lower extremities of inclined arms 36 of carriages 37. Each carriage 37 includes a longitudinally extending arm 38 provided with tandem arranged rollers 39 and 40. Upper and lower tracks 41 and 42 are carried by frame members 43 of the frame structure 20 for supporting and guiding the sweep bar supporting carriages 37. Specifically, the roller 39 of each carriage 37 is adapted to roll back and forth along its corresponding lower track 42, while the roller 40 of each carriage 37 is adapted to roll alternately on its corresponding lower track 42 and its corresponding upper track 41. Gravity biased, hinged track switches 44 at one end of the upper tracks 41 serve to switch the rollers 40 onto the upper tracks 41 when they reach the corresponding end of the lower tracks 42. More particularly, assuming the rollers 39 and 40 of the carriages 37 are on the lower tracks 42, and that the carriages 37 are being moved toward the right, as viewed in Figures 1 and 6, then when the rollers 40 reach the right end of the lower tracks 42, they pass under the track switches 44, which then move downwardly so that, as the rollers 40 move toward the left, they move upwardly onto the upper tracks 41. When the rollers 40 reach the left end of the upper tracks 41, they drop down onto the lower tracks 42 again and then remain on the lower tracks during movement of the carriages 37 to the right, upwardly biased, hinged track switches 45 being provided to ease the rollers 40 downwardly onto the lower tracks 42. Conventional spring means (not shown) may be employed to bias the track switches 45 upwardly to the position shown in full lines in Figure 6.

Thus, when the rollers 40 pass from the right end of the lower tracks 42 onto the upper tracks 41, the carriage 37 is tilted to raise the sweep bar 35; and when the rollers 40 pass from the left end of the upper tracks 41 onto the lower tracks 42, the carriage is righted to lower the sweep bar 35; whereby the sweep bar 35 follows a path of movement as shown in Figure 6, by the arrows 46. In following this path of movement in the direction of the arrows, the sweep bar functions to transfer pans from the loading shelf 32 onto the tray 29a alined therewith during movement of the sweep bar along the lower leg of the arrowed path 46, and returns above any pans on the loading shelf 32 during its return movement along the upper leg of the arrowed path 46.

Figure 2:
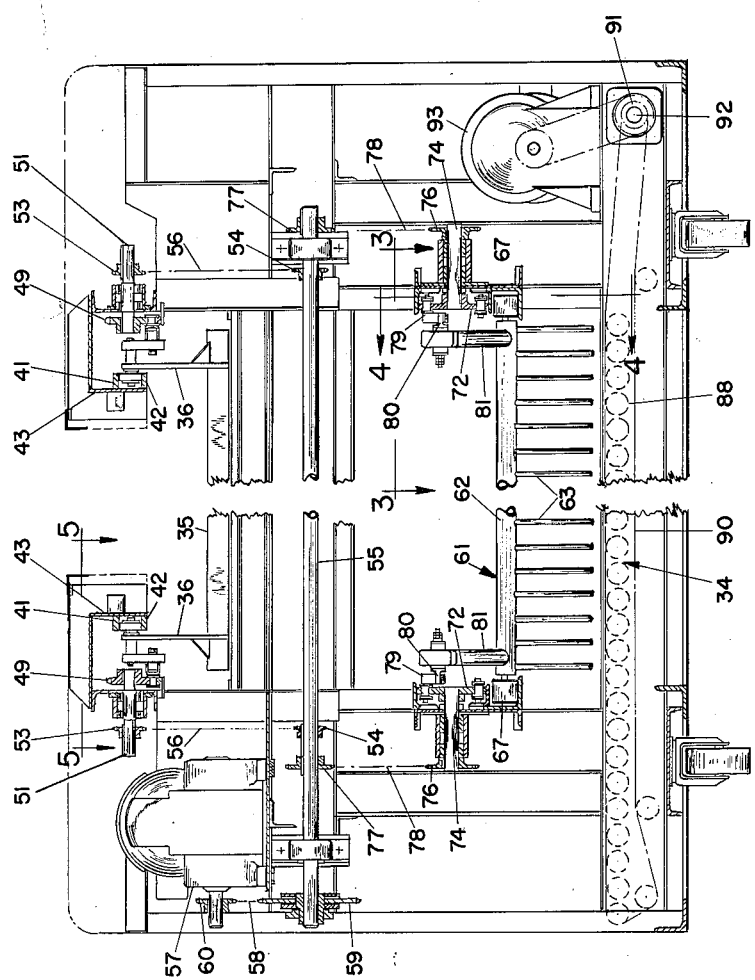
Figure 2 is a sectional view taken on line 2—2 of Figure 1, looking in the direction of the arrows.

The sweep bar 35 is driven by chains 47 respectively disposed at the sides of the carriages 37 and respectively connected to the arms 38 of the carriages 37 by links 48, the links 48 being pivotally connected to the arms 38 and to the chains 47, so that the rollers 39 and 40 carried by each carriage 37 may follow the pattern of movement described above. Each of the chains 47 is trained around sprockets 49 and 50 respectively mounted on stub shafts 51 and 52 carried by suitable bearings on the frame structure 20. As best shown in Figure 2, the shafts 51 carry additional sprockets 53 which are driven from sprockets 54 on a countershaft 55 through chains 56. The countershaft 55 is driven by a motor 57 through a chain 58 trained around a sprocket 59 on the countershaft and a sprocket 60 on the motor shaft. The loader 31, above described, is actuated intermittently and in timed relation with other elements of the device and the tray conveyor 27, as and for the purpose to be later described.

The unloader 33 includes a rake 61 comprising at the rearward end thereof a transversely extending rake bar 62, a plurality of laterally spaced rake fingers 63 rigidly secured to and depending from the bar 62, and a pair of laterally spaced longitudinally extending rake bars 64, respectively secured rigidly to the transversely extending bar 62 near the respective ends thereof and extending forwardly therefrom. At their forward ends, the longitudinally extending rake bars 64 are rigidly secured by clamp members 65 to a transversely extending bar 66, the axis of which constitutes a fulcrum about which the rake 61 is adapted to swing, as hereinafter described.

The opposite ends of the bar 66 are provided with rollers 67, the top and bottom peripheral portions of which are adapted to be engaged by laterally spaced, longitudinally extending upper and lower track members 68 and 69. The track members 68 and 69 are suitably supported by the frame structure 20 and extend from adjacent the forward end thereof beyond the rearward end thereof so as to project into the opening 25 of the oven 24. The rollers 67 are adapted to roll back and forth in the tracks 68 and 69, so that the rake 61 moves between a retracted and extended position as well as having a swinging movement and the lower ends of the rake fingers 63 follow a path of movement as shown in Figure 4, by the arrows 70. In following this path of movement in the direction of the arrows, the rake 61 functions to transfer pans from a tray, as tray 29b, alined with take-away conveyor 34, onto the said take-away conveyor 34 during movement of the rake fingers along the lower leg of the arrowed path 70, and returns above any pans on the following tray alined with take-away conveyor 34, during its return movement along the upper leg of the arrowed path 70.

The means for operating the rake 61 of the unloader 33 includes a pair of laterally spaced longitudinally extending endless chains 71. Each of the chains 71 is trained at one end around a sprocket 72 and at its other end around a sprocket 73. The sprockets 72 are fixed on transversely extending stub shafts 74 carried by suitable bearings at the forward end of the frame structure 20, and the sprockets 73 are fixed on transversely extending stub shafts 75 carried by suitable bearings at the rearward end of the frame structure 20. As best shown in Figure 2, the shafts 74 carry additional sprockets 76 which are driven from sprockets 77 on the countershaft 55 through chains 78. The countershaft 55, as previously described is driven by motor 57, so that the loader 31 and the unloader 33 are driven in timed relation from the same motor.

The operating connections between the chains 71 and the rake 61 include blocks 79, each carried on extensions of an adjacent pair of pins connecting the links of the chains 71, and extending inwardly of the loops of the chains 71. The free ends of the blocks 79 carry laterally projecting pins 80 on which are pivotally mounted an end of the lever arms 81. The opposite end of each of the lever arms 81 is rigidly secured, in any suitable manner, to the transversely extending bar 66. The offset connection of the lever arms 81 with the chains 71 constrains the path of movement of the pivotally mounted ends of the lever arms in a tighter loop, as illustrated by the broken line 82 in Figure 4, than that of the chains 71. This is an important feature, since with the chains 71 moving in the direction of the arrows and with the pivotally attached ends of the lever arms 81 moving from the upper to the lower leg of the path 82, the rake 61 swings upwardly through a smaller arc than if the pivotally mounted ends of the lever arms moved along the path of the chains 71. Thus the vertical movement of the rearward end of the rake 61 is limited so that the rake bar 62 and the rake fingers 63 upon movement of the rake 61 from its retracted to its extended position will not strike a tray of the tray conveyor 27 that is moving upwardly along vertical runs 26 to the loading position of tray 29a nor a tray moving into the unloading position of tray 29b.

The pan supporting surface of the tray 29b, as well as the other trays of the tray conveyor 27, is in the form of a grid comprising a plurality of longitudinally extending, laterally spaced rods 83, as best shown in Figure 3, having upturned rearward end portions 84, as shown in Figure 1, which serve as stops to arrest rearward movement of the pans during the loading operation.

Bridging the space between the take-away conveyor 34 and the tray 29b are horizontally alined shelf members 84 and 85, preferably of grid-like construction, supported respectively in suitable manner by the frame structure 20 and the oven 24, across which shelf members the pans are pushed by the rake 61 from the tray 29b onto the take-away conveyor 34. In similar manner, shelf members 86 and 87 bridge the space between the loading shelf 32 and the tray 29a, across which shelf members the pans are pushed by the sweep bar 35 from the loading shelf 32 onto the tray 29a.

The take-away conveyor 34 may be of any desired construction and, in the particular construction illustrated, comprises a plurality of rollers 88, each roller carrying a small sprocket 89, with the teeth of these sprockets being engaged by the upper bight of an endless chain 90. The chain 90 is also entrained over a drive sprocket 91 which is mounted on a shaft 92 driven from the motor 93, as shown in Figure 2.

The tray conveyor 27 is operated by a motor, not shown, and over a sprocket 94 fixed on a rotatable stub shaft 95 of the tray conveyor is trained a chain 96, as shown in Figure 1. The chain 96 is also trained over a sprocket 97 mounted on a shaft 98 of a gear reducer 99 which in turn operates the cam shaft 100. Mounted on cam shaft 100 are cams C1, C2, C3 and C4, which constitute part of the control system for synchronizing the operations of the loader 31, unloader 33 and take-away conveyor 34 with the operation of the tray conveyor 27.

Each of the cams is arranged to make one complete revolution for each travel of a tray through one tray space, or otherwise expressed, for travel of a tray from a position shown in Figure 1 occupied by tray 29b to a position shown occupied by tray 29a.

Figure 7:
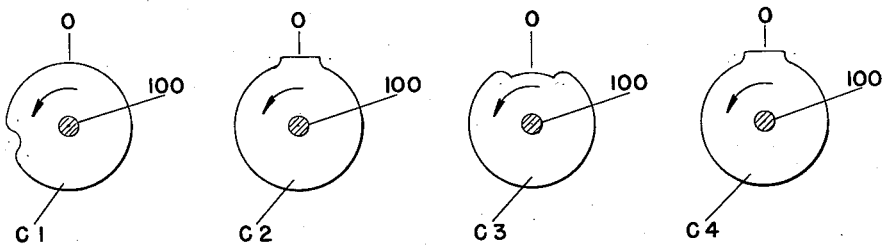
Figure 7 is a diagrammatic representation of the cams of the cam bank for controlling the various elements of the invention.

The sequence of operation of the various elements described above and the means for controlling the sequence of events will now be set forth in detail. In Figure 7, the cams C1 to C4 are shown in their relative positions with respect to a reference point O, which point O represents the load and unload positions, i.e., with the sweep bar 35, the rake 61, and the trays 29a and 29b in the positions shown in full lines in Figure 1. The cams and control means are arranged so that the sweep bar 35 and the rake 61 will have reached the depicted position at the time, or preferably about one second after the trays 29a and 29b have stopped in the illustrated load and unload positions, and at such time the switches are as shown in the wiring diagram, Figure 8.

Figure 8:
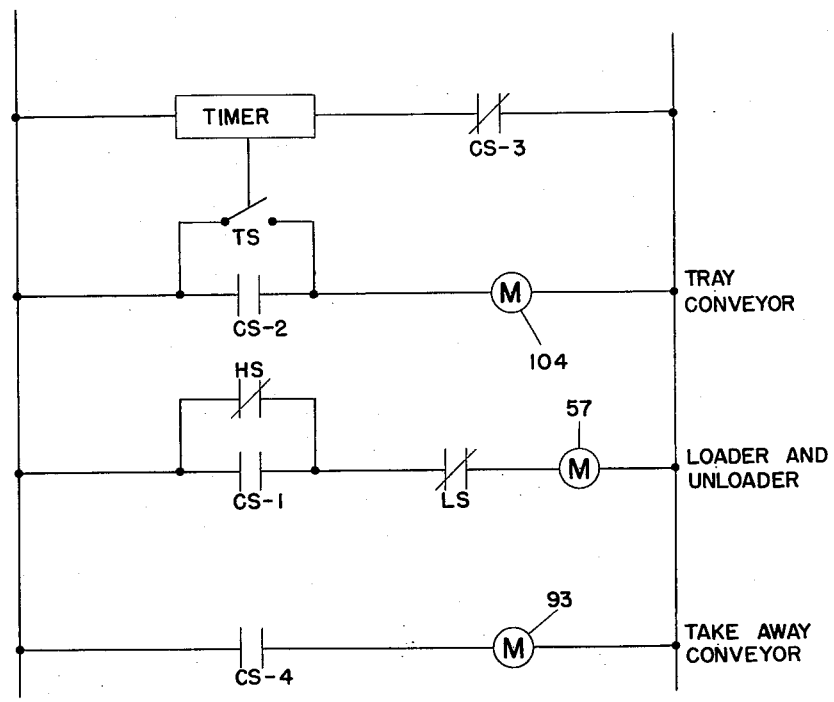
Figure 8 is a diagrammatic view of the electrical circuit of the apparatus.

With the arrival of the trays 29a and 29b in load and unload positions, cam C2 has rotated to a position such that the high part thereof reaches load and unload reference point O, as in Figure 7, at which point it opens normally closed cam switch CS–2, Figure 8. At the same time, cam C3 has rotated to a position such that the low part thereof reaches load and unload reference point O, at which point it permits normally closed cam switch CS–3 to close, energizing timer T, which when energized opens timer controlled switch TS. Thus, with both switches CS–2 and TS open, the circuit to tray conveyor motor 104 is broken and the trays 29a and 29b stop in load and unload position respectively.

Also with the arrival of the trays 29a and 29b in load and unload positions cam C4 has rotated to a position such that the high part thereof reaches load and unload reference point O, at which point it opens normally closed cam switch CS–4, breaking the circuit to take-away conveyor motor 93 and stopping the take-away conveyor 34.

At this time the sweep bar 35 and the rake 61 are operating, and have been operating for a time prior thereto, as will be hereinafter explained, since at such time a circuit through holding switch HS and normally closed limit switch LS is complete, maintaining loader-unloader motor 57 energized. Unloader rake 61 travels to the left and loader sweep bar 35 travels to the right from the positions shown in Figure 1 to respectively, unload pans of bread from tray 29b and load pans of dough onto tray 29a. When rake 61 and sweep bar 35 reach the positions shown by broken lines 101 and 102, respectively, an arm 103, rigidly carried by and projecting from that end of rake lever 81 which is pivotally mounted on pin 80, momentarily engages and opens, and then over-rides normally closed limit switch LS. Momentary opening of limit switch LS breaks the circuit to loader-unloader motor 57 and causes hold switch HS to open. Thus even though limit switch LS re-closes when arm 103 over-rides it, the circuit to loader-unloader motor 57 remains broken, since at this time cam C1 is holding normally closed cam switch CS–1 open.

The timer T, which as previously explained, was energized upon closing of cam switch CS–3 by cam C3 when the trays 29a and 29b reached their respective load and unload positions, is arranged to time out an interval after the sweep bar 35 and rake 61 complete their respective load and unload strokes. When it times out, the timer T effects re-closing of timer controlled switch TS, thereby closing a circuit to tray conveyor motor 104, whereupon trays 29a and 29b will move upward from their respective load and unload positions.

Upon re-starting of the tray conveyor 27, cam C2 will turn in the direction of the arrow, Figure 7, and the high part of cam C2 moves off the normally closed cam switch CS–2, permitting cam switch CS–2 to close, which maintains the circuit to tray conveyor motor 104 when cam C3, moving in the direction of the arrow, Figure 7, opens cam switch CS–3, resetting the timer T with concomitant re-opening of the timer controlled switch TS. Also, upon re-starting of the tray conveyor 27, the high part of cam C4 moves off cam switch CS–4 permitting it to re-close, whereupon the circuit to motor 93 is closed and the take-away conveyor operates to transport the unloaded pans away from the front of the oven 24.

When a tray has moved upward from the position shown occupied by tray 29b in Figure 1 to a position slightly above the path followed by the uppermost portion of the rake 61 during movement to its extended position, the notched portion of cam C1, Figure 7, will have reached position O where it effects momentary closing of cam switch CS–1, thereby completing a circuit to loader-unloader motor 57 and starting both the sweep bar 35 and rake 61 from their rest positions 102 and 101, respectively, to their respective load and unload positions. Hold switch HS maintains the circuit to the loader-unloader motor 57 upon reopening of cam switch CS–1 as cam C1 continues turning.

For purpose of illustration, the notch is so disposed in cam C1 as to effect closing of cam switch CS–1 with consequent starting of the sweep bar and rake from their rest positions 102 and 101, respectively, when for example tray 29b has moved upward about three quarters of a tray space, in other words three quarters of the distance up to the position shown occupied by tray 29a. During the remaining one quarter tray space movement, as tray 29b approaches the position shown occupied by tray 29a, sweep bar 35 and rake 61 move from their rest positions 102 and 101, respectively, to their respective load and unload positions, shown in full lines, with sweep bar 35 in position to push pans of dough on a tray and rake 61 in position to rake pans of bread from a tray. A complete cycle has now been completed and is ready to be repeated.

From the foregoing it will be evident that the sweep bar 35 and the rake 61 are moved into their respective load and unload positions while the trays are still moving to load and unload positions, and this is accomplished without interference between the rake 61 and the trays as the rake crosses the path of travel of the trays. As a result numerous advantages are realized, the operation of loading and unloading can be speeded up since the sweep bar and rake can be operated simultaneously and can be moved to load and unload positions while the tray conveyor is moving, at the same time this construction and arrangement permits closer spacing between the trays of the tray conveyor with consequent closer spacing between the loader and unloader, whereby a more compact structure is made possible. With the offset connection between the rake lever arms 81 and the chains 71 whereby the vertical swinging movement of the rearward end of the rake 61 is limited, as before described, it will be seen that the rake can be moved to its unloading position across the path of the trays while the previously unloaded tray is still a considerable distance below its loading position, thereby permitting a further speed up in the loading and unloading operations.

I claim:

1. In a baking oven provided with an opening in the front wall thereof; an endless tray conveyor in said oven including a series of equidistantly spaced pan supporting trays, said conveyor having a section movable in a vertical path to bring a pair of successive trays in close proximity to said opening; a loading and an unloading pan supporting shelf associated with said opening, said pan supporting shelves being spaced a vertical distance apart equal to the spacing between said pair of trays and having their rearward ends disposed adjacent the vertical path of said tray conveyor; a motor for actuating said tray conveyor; means for de-energizing said motor for timed intervals when said trays are in alinement with said shelves; a sweep member movable between retracted and extended positions over said loading pan supporting shelf; actuating means for imparting reciprocating movement to said sweep member between said retracted and extended positions; a rake member movable between retracted and extended positions across the vertical path of said tray conveyor; actuating means for imparting reciprocating movement to said rake member between said retracted and extended positions; a motor for operating said sweep and rake actuating means; control means including switch means responsive to said tray conveyor upon approach but before alinement of said pair of trays with said shelves for energizing said sweep and rake actuating means motor to move said sweep to retracted position and said rake to extended position as said pair of trays approach alinement with said shelves, and to move said sweep member to extended position and said rake member to retracted position upon alinement of said pair of trays with said shelves, whereby upon said last named movement of said sweep member and rake member, said sweep member moves over said loading pan supporting shelf for engaging pans thereon and slidingly moving them therefrom onto an alined tray of said tray conveyor, and said rake member moves over a tray of said tray conveyor alined with said unloading pan supporting shelf for engaging pans on said alined tray and slidingly moving them therefrom onto said unloading pan supporting shelf; said control means also including switch means responsive to movement of said sweep and rake members to said last named positions for de-energizing said sweep and rake actuating means motor.

2. A reciprocating transfer device for slidingly moving articles from a first article support onto an adjacent second article support including, a pair of parallel laterally spaced endess chains disposed above said second support defining closed loops having upper and lower runs, means for unidirectionally driving said chains, a guide track parallel and adjacent each of said endless chains, a carriage, means pivotally connecting the forward end of said carriage to said chains for moving the forward end of said carriage in a closed loop path, said carriage having at its rearward end a pivotal mounting in said guide tracks fixed against vertical displacement and movable longitudinally in said guide tracks, operation of said chains imparting reciprocating movement to said carriage and tilting said carriage about its pivotally mounted rearward end as its pivotally connected forward end follows the endless chains from one to the other of their upper and lower runs, and a rake member rigidly fixed to the rearward end of said carriage for pivotal and longitudinal movement therewith to move said rake member over said first support from an extended to a retracted position at an elevation for engaging articles and slidingly transferring them onto said second support and from retracted to extended position at an elevation above the articles on said first support.

3. An unloading device for an oven having an unloading opening and an endless tray conveyor including a vertical run adjacent said opening; said unloading device comprising a supporting frame; a horizontal pan support mounted on said frame and an extension thereof extending through said opening to a point adjacent the vertical run of said tray conveyor; a pair of laterally spaced, longitudinally extending endless chains carried by said frame above said horizontal pan support defining closed loops having upper and lower runs; means for unidirectionally driving said chains; longitudinally extending guide track means carried by said frame; a carriage between and having a pivotal connection at one end to said chains for imparting reciprocating movement to said carriage toward and away from said opening; means at the opposite end of said carriage engageable in said guide track means for constraining the said opposite end of said carriage in a rectilinear path of movement whereby said carriage will assume different angularly tilted positions as its pivotally mounted end follows the upper and lower runs of said chains; and a rake member rigidly fixed to said opposite end of said carriage and extending rearwardly thereof for movement by said carriage over a tray alined with said horizontal pan support from an extended to a retracted position in a path for engaging pans on said tray and slidingly pushing them off said tray and across said extension onto said pan support, and for movement by said carriage from retracted to extended position at an elevation sufficient to clear pans on a tray alined with said pan support.

4. In a baking oven provided with an unloading opening; an endless tray conveyor in said oven including a series of pan supporting trays, said conveyor including a vertical run adjacent said opening; a horizontal pan supporting shelf having an outer portion outside said oven and an inner portion extending through said opening to a point adjacent the vertical run of said tray conveyor; a reciprocating transfer device including actuating means therefor disposed above the outer portion of said pan supporting shelf and a rake member extending rearward of said actuating means; said actuating means including means for constraining movement of said rake member from an extended to a retracted position for engaging pans on a tray alined with said pan supporting shelf and slidingly pushing them off said tray and across the inner portion of said pan supporting shelf onto the outer portion thereof, and constraining movement of said rake member from a retracted to an extended position at an elevation sufficient to clear pans on a tray alined with said pan supporting shelf; a motor for operating said transfer device; means actuated upon movement of said rake member to retracted position for de-energizing said motor; and means actuated in timed relation with movement of said trays for energizing said motor when a tray has moved upwardly from its alined position with said pan supporting shelf a distance sufficient to clear said rake in its elevated path of movement to extended position.

5. In a baking oven provided with an opening in the front wall thereof; an endless tray conveyor in said oven including a series of equidistantly spaced pan supporting trays, said conveyor including a vertical run adjacent said opening; a horizontal unloading pan supporting shelf associated with said opening and having its rearward end adjacent the vertical run of said tray conveyor; a reciprocating transfer device including actuating means therefor disposed above said pan supporting shelf and a rake member extending rearward of said actuating means; said actuating means including means for constraining movement of said rake member from an extending to a retracted position for engaging pans on a tray alined with said pan supporting shelf and slidingly pushing them off said tray onto said pan supporting shelf, and constraining movement of said rake member from a retracted to an extended position at an elevation sufficient to clear pans on a tray alined with said pan supporting shelf; a motor for operating said rake actuating means; control means including switch means responsive to said tray conveyor upon approach of a tray to alinement with said pan supporting shelf for energizing said rake actuating means motor to move said rake to extended position as said tray approaches alinement with said pan supporting shelf, and to move said rake member to retracted position upon alinement of said tray with said pan supporting shelf, whereby upon said last named movement of said rake member, said rake member moves over a tray of said tray conveyor alined with said pan supporting shelf for engaging pans on said alined tray and slidingly moving them therefrom onto said pan supporting shelf; said control means also including switch means responsive to movement of said rake member to said last named position for deenergizing said rake actuating means motor.

6. In a baking oven provided with an opening in the front wall thereof; an endless tray conveyor in said oven including a series of equidistantly spaced pan supporting trays, said conveyor having a section movable in a vertical path to bring a pair of successive trays in close proximity to said opening; a horizontal loading and a horizontal unloading pan supporting shelf adjacent said vertical conveyor section, said pan supporting shelves being spaced a vertical distance apart equal to the vertical spacing between said pair of trays, actuating means for said endless tray conveyor to aline a pair of trays with said pair of shelves, a sweep member and a rake member disposed in vertical spaced relation, said sweep member being disposed for movement in a horizontal plane between retracted and extended positions over said loading pan supporting shelf to engage on its extending stroke pans thereon and slidingly move them therefrom onto the tray of said pair of trays alined with said loading pan supporting shelf, said rake member being disposed for movement in a horizontal plane between retracted and extended positions across the vertical path of the tray conveyor to engage on its retracting stroke pans on the tray of said pair of trays alined with said unloading pan supporting shelf and slidingly move them onto said unloading pan supporting shelf, and actuating means simultaneously moving said sweep member to extended position across said loading shelf and said rake member to retracted position across the tray of said pair of trays alined with said unloading shelf to concurrently load and unload said pair of trays when alined with said shelves.

References Cited in the file of this patent

UNITED STATES PATENTS

| | | |
|---|---|---|
| 1,795,352 | Sundbom | Mar. 10, 1931 |
| 2,111,700 | Stokes | Mar. 22, 1938 |
| 2,450,111 | Brosemer | Sept. 28, 1948 |
| 2,900,927 | Engels et al. | Aug. 25, 1959 |

FOREIGN PATENTS

| | | |
|---|---|---|
| 696,122 | Great Britain | Aug. 26, 1953 |